US012627226B2

(12) United States Patent
Phadke

(10) Patent No.: US 12,627,226 B2
(45) Date of Patent: May 12, 2026

(54) SWITCHED CAPACITOR CONVERTER WITH TAP-CHANGE CAPABILITY

(71) Applicant: Apple Inc., Cupertino, CA (US)

(72) Inventor: Vijay G Phadke, San Jose, CA (US)

(73) Assignee: Apple Inc., Cupertino, CA (US)

( * ) Notice: Subject to any disclaimer, the term of this patent is extended or adjusted under 35 U.S.C. 154(b) by 639 days.

(21) Appl. No.: 18/068,331

(22) Filed: Dec. 19, 2022

(65) Prior Publication Data

US 2024/0204658 A1    Jun. 20, 2024

(51) Int. Cl.
*H02M 3/07* (2006.01)
*H02J 7/00* (2006.01)
*H02M 1/14* (2006.01)

(52) U.S. Cl.
CPC .............. *H02M 3/07* (2013.01); *H02J 7/007* (2013.01); *H02M 1/14* (2013.01); *H02J 2207/20* (2020.01)

(58) Field of Classification Search
CPC ........ H02M 3/07; H02M 1/14; H02M 1/0022; H02M 1/007; H02M 3/077; H02M 7/4837; H02J 7/007; H02J 2207/20; H02J 7/00; H02J 7/02; H02J 7/04; H02J 7/06
See application file for complete search history.

(56) References Cited

U.S. PATENT DOCUMENTS

| | | | | |
|---|---|---|---|---|
| 8,089,788 | B2 * | 1/2012 | Jain | H02M 3/07 |
| | | | | 363/60 |
| 10,958,165 | B1 * | 3/2021 | Ma | H02M 3/077 |
| 11,146,170 | B2 * | 10/2021 | Xiong | H02M 3/07 |
| 11,387,666 | B2 | 7/2022 | Dalena | |
| 11,515,793 | B2 | 11/2022 | Cannillo et al. | |
| 2013/0119961 | A1 | 5/2013 | Okuda | |
| 2014/0266135 | A1 | 9/2014 | Zhak | |
| 2016/0329809 | A1 | 11/2016 | Granato | |
| 2018/0337539 | A1 * | 11/2018 | Christiaans | H02J 7/04 |
| 2018/0337545 | A1 * | 11/2018 | Crosby | H02J 7/00712 |
| 2019/0149041 | A1 * | 5/2019 | Larsen | H02M 1/088 |
| | | | | 307/151 |
| 2020/0295587 | A1 | 9/2020 | Giuliano et al. | |
| 2021/0067042 | A1 * | 3/2021 | Liu | H02M 3/1584 |
| 2022/0376616 | A1 | 11/2022 | Hu et al. | |
| 2023/0047446 | A1 * | 2/2023 | Liu | H02J 7/0016 |
| 2023/0134427 | A1 * | 5/2023 | Liu | H02M 1/0043 |
| | | | | 323/271 |

(Continued)

*Primary Examiner* — Nha T Nguyen
(74) *Attorney, Agent, or Firm* — FLETCHER YODER PC

(57) ABSTRACT

A switched capacitor converter battery charging circuit can include an input that receives an input current, an output that delivers an integer multiple of the input current to a battery, a plurality of flying capacitor stages disposed between the input and output, and controller circuitry coupled to the flying capacitor stages that selectively enables or disables one or more of the flying capacitor stages to select the integer multiple responsive to a voltage supplied at the input. The flying capacitor stages can include a first plurality of flying capacitor stages forming a first phase of the converter and a second plurality of flying capacitor stages forming a second phase of the converter. The first and second phases can be operated in an interleaved manner to reduce current or voltage ripple. The converter can include three flying capacitor stages, providing for selection of integer multiples of 4×, 3×, 2×, or 1×.

18 Claims, 9 Drawing Sheets

(56)                References Cited

U.S. PATENT DOCUMENTS

2023/0216413 A1 *   7/2023   Kumar ................. H02M 1/143
                                                        323/272
2023/0344365 A1 * 10/2023   Kumar ................... H02M 3/07
2024/0146194 A1 *   5/2024   Meyvaert ............. H02M 3/158

* cited by examiner

0=ALWAYS OFF ( X )
1= ALWAYS ON ( —— )
1/0 or 0/1 = Switching at ~50% duty

For 20V input from adapter

SWITCHED CAPACITOR CONVERTER WITH TAP-CHANGE CAPABILITY

BACKGROUND

Switched capacitor converters, also known by various other names such as "SwCap converters" or "flying capacitor converters" or simply "charge pumps" may be used in fast charging of the battery of portable devices, for example using a USB-C/USB-PD Programmable Power Source (PPS). Use of switched capacitor converters can overcome a current-carrying limitation of charging port of the adapter and/or charging cable. For example, some devices may have a current limit of about 3 A, while higher current levels may be desired for battery charging.

In such a charging configuration, an external AC/DC adapter may be operated as effectively a current source. The current from the adapter can be provided to the switched capacitor converter located in the portable device. A capacitor can placed at the input of the switched capacitor converter for filtering purpose. The switched capacitor converter can have a transformer like operation, i.e., it steps down the output voltage, while stepping up the output current in the same proportion. Thus, according to the example, the 3 A current that is available from the AC/DC adapter can be stepped up based on the switched capacitor converter step down ratio. In this mode, the switched capacitor converter can be considered as a current multiplier that delivers higher current to the battery for fast charging.

Some switched capacitor converters may not be capable of independent voltage regulation. In other words, there may be a fixed proportional relationship between the input voltage and the output voltage. In the given example of a battery charger, the voltage at the input of the switched capacitor converter is an integer multiple of the battery voltage. Thus, the AC/DC adapter can regulate the charging current with the output voltage of the adapter (input voltage of the switched capacitor converter) being effectively clamped at a level based on the conversion ratio of the switched capacitor converter.

SUMMARY

One aspect of such configurations that may be undesirable in some applications is the fixed ratio between the battery charging voltage and input voltage into the switched capacitor converter. Thus, it may be desirable to provide a switched capacitor converter that can operate with different conversion ratios and therefore accommodate a wider range of input voltages (e.g., different voltages supplied by an AC/DC adapter).

A switched capacitor converter battery charging circuit can include an input configured to receive an input current, an output configured to deliver an integer multiple of the input current to a battery, a plurality of flying capacitor stages disposed between the input and output, and controller circuitry coupled to the plurality of flying capacitor stages that selectively enables or disables one or more of the flying capacitor stages to select the integer multiple responsive to a voltage supplied at the input. The plurality of flying capacitor stages can include a first plurality of flying capacitor stages forming a first phase of the converter and a second plurality of flying capacitor stages forming a second phase of the converter. The first and second phases can be operated in an interleaved manner to reduce current or voltage ripple. Each of the plurality of flying capacitor stages can include a flying capacitor, a high side complementary switch pair, and a low side complementary switch pair. The switched capacitor converter can include three flying capacitor stages, providing for selection of integer multiples of 4×, 3×, 2×, or 1×.

The controller can operate the high side complementary switch pair and the low side complementary switch pair of a selectively enabled flying capacitor stage to alternate between connecting the flying capacitor in series with the battery and in parallel with the battery. Switching devices of the respective complementary switch pairs can be operated with a 50% duty cycle. The controller can operate selected switching devices of a selectively disabled flying capacitor stage as always on or always off to prevent a corresponding flying capacitor from charging and discharging. The controller can operate selected switching devices of a selectively disabled flying capacitor stage as always on or always off to prevent a corresponding flying capacitor from charging and discharging by operating the low side complementary switch pair as always off, operating one of the high side complementary switch pair as always on, and operating another of the high side complementary switch pair with a 50% duty cycle. The controller can disable all flying capacitor stages by operating a high side complementary switch pair as both always on and operating all other switching devices as always off.

A switched capacitor converter battery charging circuit can include an input configured to receive an input current, an output configured to deliver an integer multiple of the input current to a battery, a plurality of phases each phase comprising a plurality of flying capacitor stages disposed between the input and output, wherein the plurality of phases are operated in an interleaved manner to reduce current or voltage ripple, and controller circuitry coupled to the plurality of flying capacitor stages that selectively enables or disables one or more of the flying capacitor stages to select the integer multiple responsive to a voltage supplied at the input. Each of the plurality of flying capacitor stages can include a flying capacitor, a high side complementary switch pair, and a low side complementary switch pair. The switched capacitor converter can include three flying capacitor stages, providing for selection of integer multiples of 4×, 3×, 2×, or 1×.

The controller can operate the high side complementary switch pair and the low side complementary switch pair of a selectively enabled flying capacitor stage to alternate between connecting the flying capacitor in series with the battery and in parallel with the battery. Switching devices of the respective complementary switch pairs can be operated with a 50% duty cycle. The controller can operate selected switching devices of a selectively disabled flying capacitor stage as always on or always off to prevent a corresponding flying capacitor from charging and discharging. The controller can operate selected switching devices of a selectively disabled flying capacitor stage as always on or always off to prevent a corresponding flying capacitor from charging and discharging by operating the low side complementary switch pair as always off, operating one of the high side complementary switch pair as always on, and operating another of the high side complementary switch pair with a 50% duty cycle. The controller can disable all flying capacitor stages by operating a high side complementary switch pair as both always on and operating all other switching devices as always off.

A method of operating a switched capacitor converter battery charger can include selectively enabling or disabling one or more flying capacitor stages of the switched capacitor converter to select an integer multiple applied to an input current of the battery charger to produce an output current supplied to the battery, wherein the integer multiple is selected in response to an input voltage of the switched capacitor converter battery charger. Selectively enabling one or more flying capacitor stages can include operating a plurality of switching devices with a 50% duty cycle to alternate between connecting flying capacitors of the one or more flying capacitor stages in series with the battery and in parallel with the battery. Selectively disabling one or more flying capacitor stages can include operating one or more switching devices as always on and one or more switching devices always off to prevent flying capacitors of the one or more flying capacitor stages from charging and discharging.

DETAILED DESCRIPTION

Figure 1:
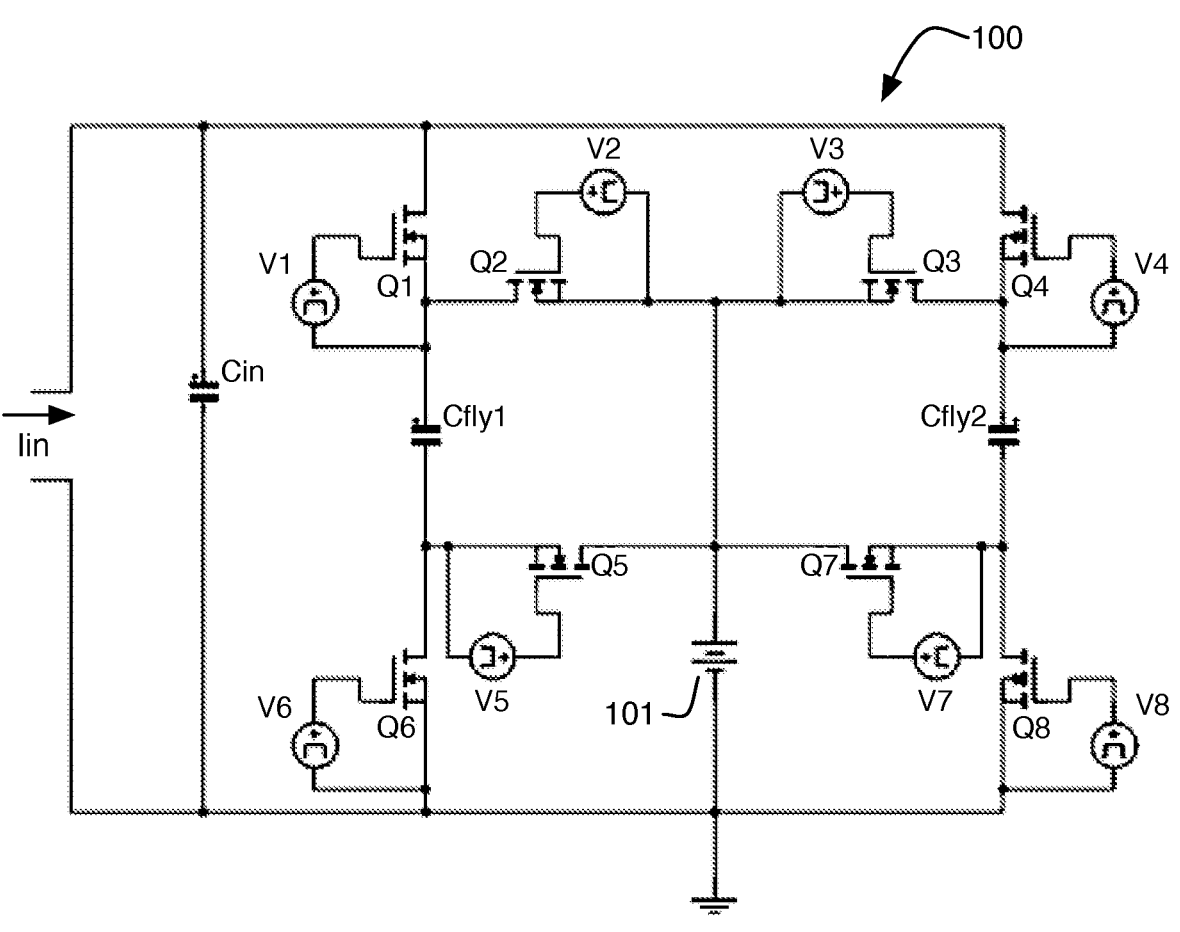
FIG. 1 illustrates a two-phase switched capacitor converter used as a battery charger.
Figure 1:
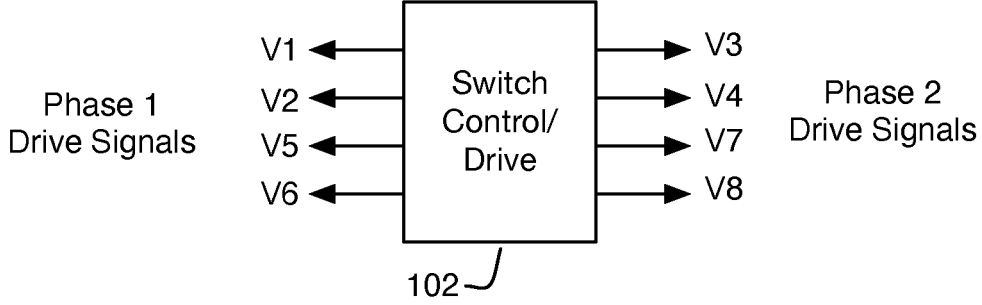

In the following description, for purposes of explanation, numerous specific details are set forth to provide a thorough understanding of the disclosed concepts. As part of this description, some of this disclosure's drawings represent structures and devices in block diagram form for sake of simplicity. In the interest of clarity, not all features of an actual implementation are described in this disclosure. Moreover, the language used in this disclosure has been selected for readability and instructional purposes, has not been selected to delineate or circumscribe the disclosed subject matter. Rather the appended claims are intended for such purpose.

Various embodiments of the disclosed concepts are illustrated by way of example and not by way of limitation in the accompanying drawings in which like references indicate similar elements. For simplicity and clarity of illustration, where appropriate, reference numerals have been repeated among the different figures to indicate corresponding or analogous elements. In addition, numerous specific details are set forth to provide a thorough understanding of the implementations described herein. In other instances, methods, procedures, and components have not been described in detail so as not to obscure the related relevant function being described. References to "an," "one." or "another" embodiment in this disclosure are not necessarily to the same or different embodiment, and they mean at least one. A given figure may be used to illustrate the features of more than one embodiment, or more than one species of the disclosure, and not all elements in the figure may be required for a given embodiment or species. A reference number, when provided in a given drawing, refers to the same element throughout the several drawings, though it may not be repeated in every drawing. The drawings are not to scale unless otherwise indicated, and the proportions of certain parts may be exaggerated to better illustrate details and features of the present disclosure.

FIG. 1 illustrates a two-phase switched capacitor converter 100 that can be used as a battery charger to charge battery 101. The converter can be incorporated into an electronic device, such as a smart phone, tablet computer, laptop computer, smartwatch, etc. or an accessory or peripheral device such as a wireless earphones, styluses, keyboards, mice, trackpads, etc. The power adapter (not shown) that supplies power to converter 100 can be considered as a current source. Converter 100 is a two-phase converter with flying capacitor Cfly1 together with its associated switching devices Q1, Q2, Q5, and Q6 being a first phase and flying capacitor Cfly2 together with its associated switching devices Q3, Q4, Q7, and Q8 being a second phase. Also illustrated are the corresponding switch drive signals V1-V8.

The drive signals may be generated by driver/controller circuitry, referred to as control circuitry 102. Although illustrated as a single block, control circuitry 102 may be implemented using a wide variety of discrete or integrated circuit structures employing analog, digital, and/or programmable circuitry. A wide variety of such circuits can be constructed and configured and/or programmed to operate so that each phase of converter 100 can operate at 50% duty cycle and 180 degrees out of phase with respect to the other phase to provide charging current to battery 100. Such interleaved operation can reduce the voltage/current ripple. In other embodiments, only a single phase can be provided, at the cost of increased voltage/current ripple. In still other embodiments, multiple phases could be provided, with the interleaved operation including phase shifting the operation of the respective phases evenly throughout the 360 degrees of the switching cycle. For example, three phases could be operated with a relative phase shift of 120 degrees, four phases could be operated with a relative phase shift of 90 degrees, etc.

In either case, the current Iin delivered to converter 100 can be doubled by converter 100, while the voltage is halved. Stated another way, converter 100 has a 2:1 voltage conversion ratio or gain from input to output and a corresponding a 1:2 current conversion ratio or gain. The voltage appearing across input capacitor Cin is thus two times the terminal voltage of battery 101. In some applications, the voltage across input capacitor Cin may be slightly higher than two times the battery voltage, depending upon the impedance of the converter 100. Thus, if the maximum battery terminal voltage is expected to be 4.5V upon full charge, then the reflected input voltage will be approximately 9V. Thus, a USB-C/USB-PD AC/DC adapter used for battery charging should be able to operate as a USB-C/USB-PD Programmable Power Source ("PPS") up to 9V or higher.

To achieve even faster charging, a current tripler or current quadrupler could be used with an AC/DC adapter with USB-C/USB-PD PPS capability having an output voltage capability of 15V or 20V respectively. Thus, from a 3 A rated USB-C/USB-PD PPS capable adapter, a current doubler, tripler, or quadrupler can deliver charging current of 6 A, 9 A, or 12 A respectively to the battery, provided that the adapter voltage and power can scale up in that proportion. USB-C/USB-PD PPS adapters come in various nominal ratings. A few examples include 9V/3 A=27 W. 15V/3 A=45 W, and 20V/3 A=60 W. Thus, a device that uses a lithium cell with a full charge voltage of ~4.5V and employs a current quadrupler to achieve fast charging needs a 20V/3 A=60 W rated ac/dc adapter. This highlights one limitations of this methodology, namely the fixed step-down ratio of the flying capacitor converter topology.

More specifically, if a particular device employs a current quadrupler to charge a 4.5V battery, then it must use an AC/DC adapter that can deliver its rated current at 18V or higher. If the device is connected to a 9V/3 A or 15V/3 A adapter, it will not be able to charge and must employ an alternate charger circuit. The alternate charger circuit may add cost, increase spatial/volumetric requirements, and add complexity to the charger system, particularly if the alternate charger circuit is capable of delivering of higher charging current. Such circuitry may also not be as efficient as the switched capacitor converter arrangement. Alternatively, if a low power alternate charger circuit is used, the user experience may be diminished by the slower charging rate.

The following description illustrates an improved switched capacitor converter that can overcome these limitations and by operating at various discrete conversion ratios without using additional components or alternate charging circuitry. Thus, as one example, the same device can draw 12 A, 9 A, and 6 A from USB-C/USB-PD PPS AC/DC adapters having a 20V, 15V, or 9V rating.

Figure 2A:
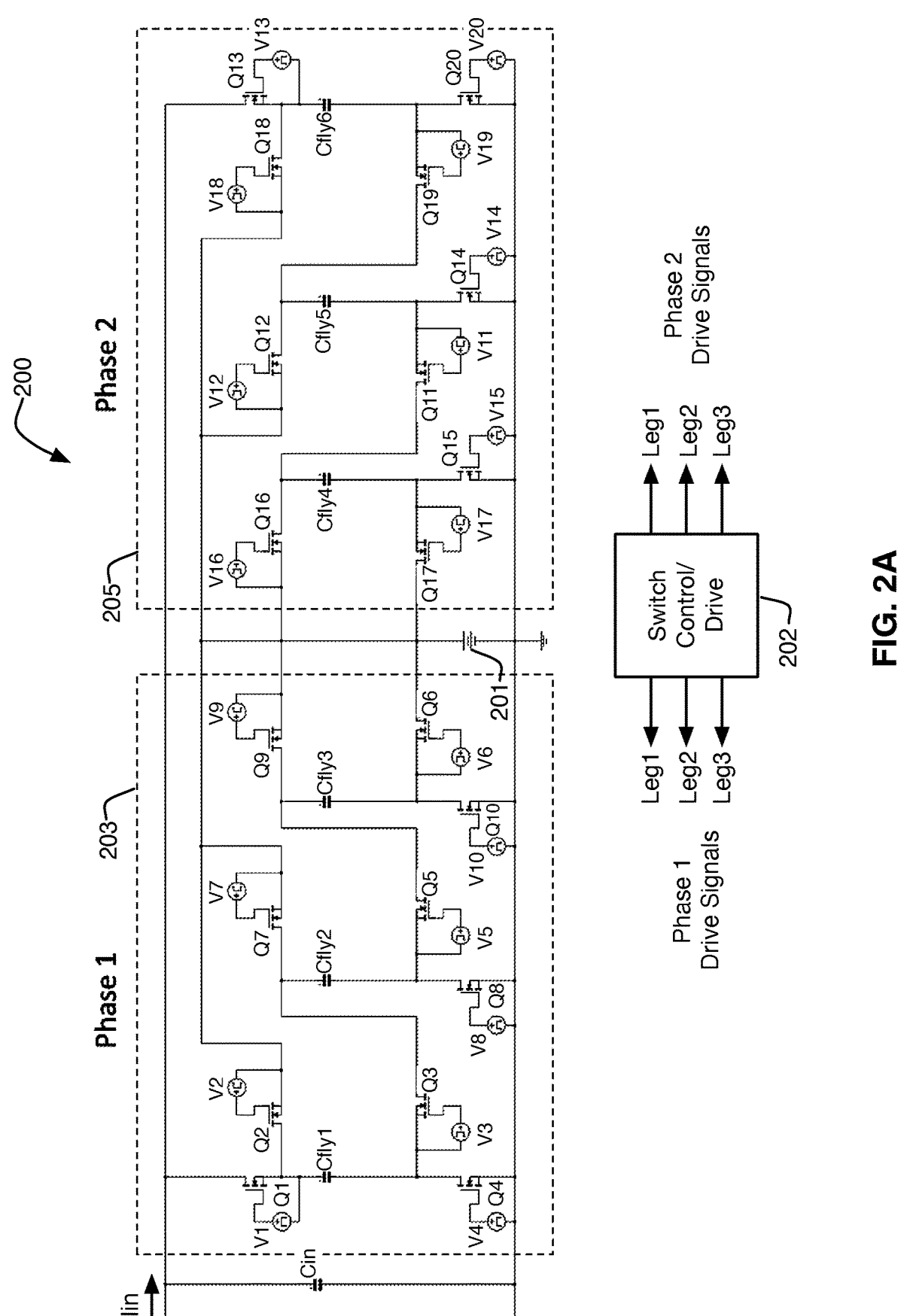
FIGS. 2A-2B illustrate a two-phase switched capacitor converter in a current quadrupler configuration.
Figure 2B:
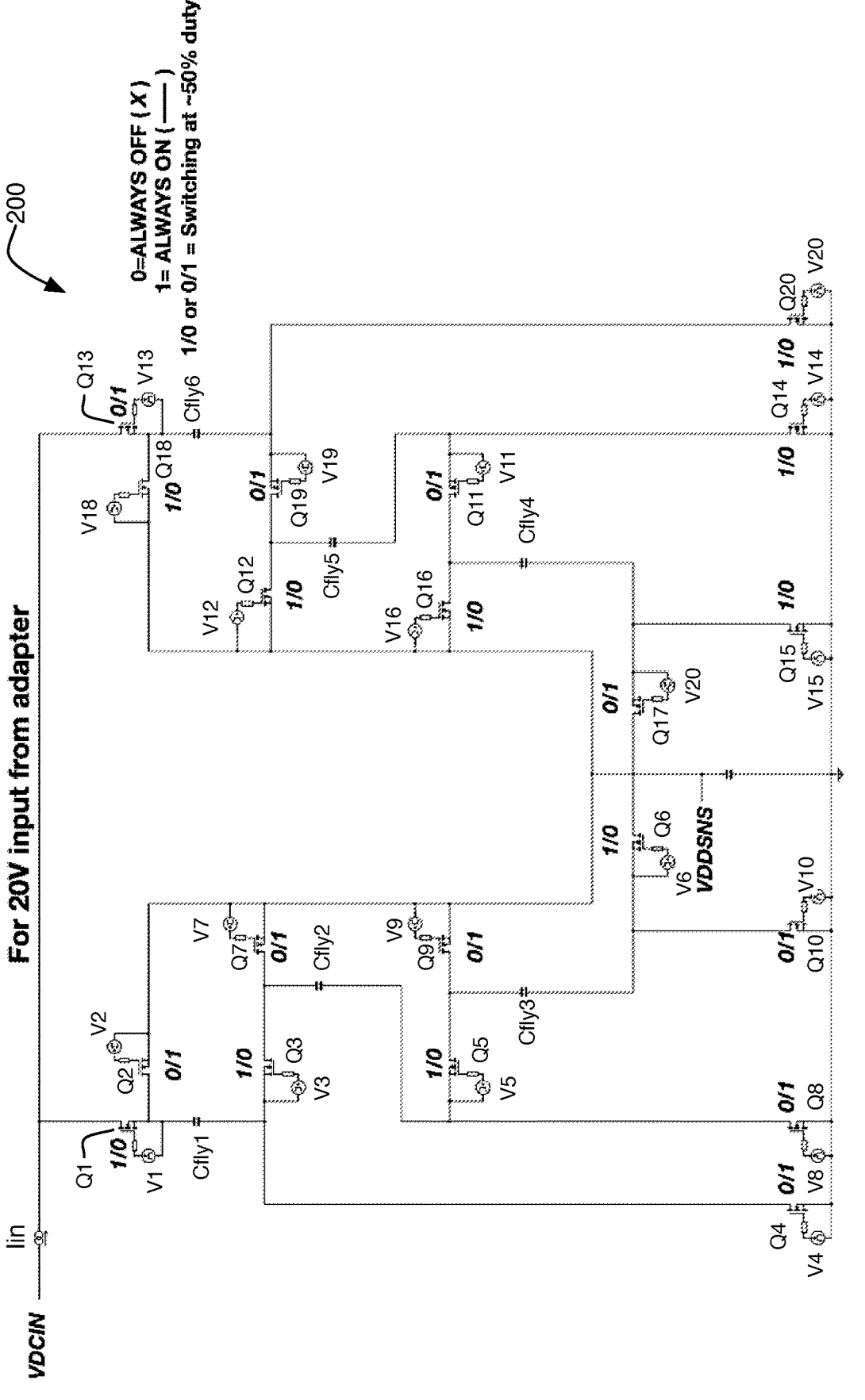

FIGS. 2A-2B illustrate an improved two-phase switched capacitor converter 200 in a current quadrupler configuration. Phase 1 (203) includes a first leg that further includes flying capacitor Cfly1, and associated switching devices Q1, Q2. Q3, and Q4. Also illustrated are corresponding switching device drive signals V1-V4, which can be generated by control circuitry 202, described in greater detail below. Phase 1 (203) also includes a second leg Cfly2 together with associated switching devices Q3 (also part of leg 1), Q5, Q7, and Q8. Also illustrated are corresponding switching device drive signals V3, V5, V6, and V8, also generated by control circuitry 202. Finally, Phase 1 (203) also includes a third leg that further includes flying capacitor Cfly3 and associated switching devices Q5 (also part of leg 2), Q6, Q9, and Q10. Also illustrated are corresponding switching device drive signals V5, V6, V9, and V10, also generated by control circuitry 202.

Similarly, Phase 2 (205) includes a first leg that further includes flying capacitor Cfly6, and associated switching devices Q13, Q18, Q19, and Q20. Also illustrated are corresponding switching device drive signals V13, V18, V19, and V20, which can be generated by control circuitry 202, described in greater detail below. Phase 2 (205) also includes a second leg Cfly5 together with associated switching devices Q18 (also part of leg 1), Q11, Q12, and Q14. Also illustrated are corresponding switching device drive signals V18, V11, V12, and V14, also generated by control circuitry 202. Finally, Phase 2 (205) also includes a third leg that further includes flying capacitor Cfly4 and associated switching devices Q11 (also part of leg 2), Q15, Q16, and Q17. Also illustrated are corresponding switching device drive signals V11, V15, V16, and V17, also generated by control circuitry 202.

Controller/drive circuitry 202 may be constructed similarly to controller 102 above, i.e., using any suitable combination of discrete or integrated circuits implementing with analog, digital, and/or programmable circuitry. Control circuitry 202 can be configured to generate control and drive signals for the respective switching devices of converter 200 to provide for the operation described below.

First, each converter phase can operate with 180 phase shift relative to the other for input ripple reduction. Alternatively, one phase could be omitted making converter 200 a single phase converter, although at the cost of increased ripple. Each phase can charge its flying capacitors while delivering energy to battery 201 during a first half cycle of a switching period. Then, the flying capacitors can discharge during the next half cycle while continuing to deliver energy to battery 201. Interleaved operation of the two phases helps keep input current Iin substantially flat and reduces the size of the input filter capacitor Cin.

Second, all the devices shown in the schematics of FIG. 2A are switching at close to 50% duty cycle based on their assigned sequence. There is no static device which is always ON or OFF, as in the configurations of FIGS. 3A-5B, discussed in greater detail below. By "close to 50% duty cycle" it is meant that the switches operate at a 50% duty cycle with a slight dead time between turn off of one switch and turn on of its counterpart to prevent cross-conduction. Details of the switching operation may be further understood with reference to FIG. 2B which further illustrates converter 200 in a 4:1 operating configuration. In the 4:1 operating configuration, the input current Iin (e.g., current delivered by an AC/DC adapter) is multiplied by four times and delivered to a battery cell. As one example, such a configuration could be capable of charging battery 201 up to 4.5V by using a 20V rated USB-C/USB-PD PPS adapter.

Although drawn with a different orientation, the circuit configuration of FIG. 2B is identical to that of FIG. 2A. Phase 1, including flying capacitor legs corresponding to flying capacitors Cfly1-Cfly3 and associated switching devices, is illustrated on the left side of the schematic, and Phase 2, including flying capacitor legs corresponding to flying capacitors Cfly4-Cfly6 and associated switching devices, is illustrated on the right side of the schematic. Each switch is marked to indicate the nature of its drive signal. Switches that are always off are marked with a "0". Switches that are always on are marked with a "1". Switches that operate with a 50% duty cycle are marked with a "0/1" or "1/0" to indicate their respective phase angle. That is, a switch marked "0/1" operates 180 degrees out of phase with respect to a switch marked "1/0". In other words, the former is on when the latter is off and vice versa.

As can be seen from FIG. 2B, each flying capacitor has a complementary high side switch pair and a complementary low side switch pair. By complementary, it is meant that one of each switch pair is off while the other is on. By high side switch pair, it is meant that each flying capacitor has an associated "high side" complementary switch pair that alternately and selectively couples one terminal of the flying capacitor to the input bus (to allow charging of the flying capacitor) or to the battery (to allow discharging of the flying capacitor). By low side switch pair, it is meant that each flying capacitor has an associated "low side" complementary switch pair that alternately and selectively couples the other terminal of the flying capacitor to ground (optionally through further flying capacitor legs and the battery) to facilitate the flying capacitor charging and discharging described.

For example, flying capacitor Cfly1 has a high side switch pair Q1/Q2 and a low side switch pair Q3/Q4. When switches Q1 and Q3 are turned on, flying capacitor Cfly1 is charged from the input bus. Additionally, switches Q5, Q6 are also turned on, which couples flying capacitors Cfly1, Cfly2, and Cfly 3 in series with the battery, charging all three. During this time, switches Q2 and Q4 are turned off. During the other half of the switching cycle, switches Q2 and Q4 are turned on coupling flying capacitor Cfly1 in parallel with the battery, allowing the flying capacitor to discharge into the battery. Additionally, switching devices Q7, Q9, Q8, and Q10 are also on during this period, coupling flying capacitors Cfly2 and Cfly3 in parallel with the battery as well. Operation of Phase 2 is similar and can be understood by reference to the switching notation provided in FIG. 2B.

As a result of the above-described 4:1 operating configuration, the input current Iin is multiplied by four times and delivered to a battery cell. Considering Phase 1, during the first half of the switching cycle, a charging current flows in series through flying capacitors Cfly1, Cfly2, and Cfly3 and the battery via switches Q1, Q3, Q5, and Q6. During the second half of the switching cycle, flying capacitors Cfly1, Cfly2, and Cfly3 are coupled in parallel with the battery via switches Q2, Q7, Q9, and Q10, allowing the flying capacitors to discharge into the battery. As a result, the input voltage appearing across input capacitor Cin is approximately 4× the battery cell voltage, and the average battery current is approximately 4× the input current Iin.

Figure 3A:
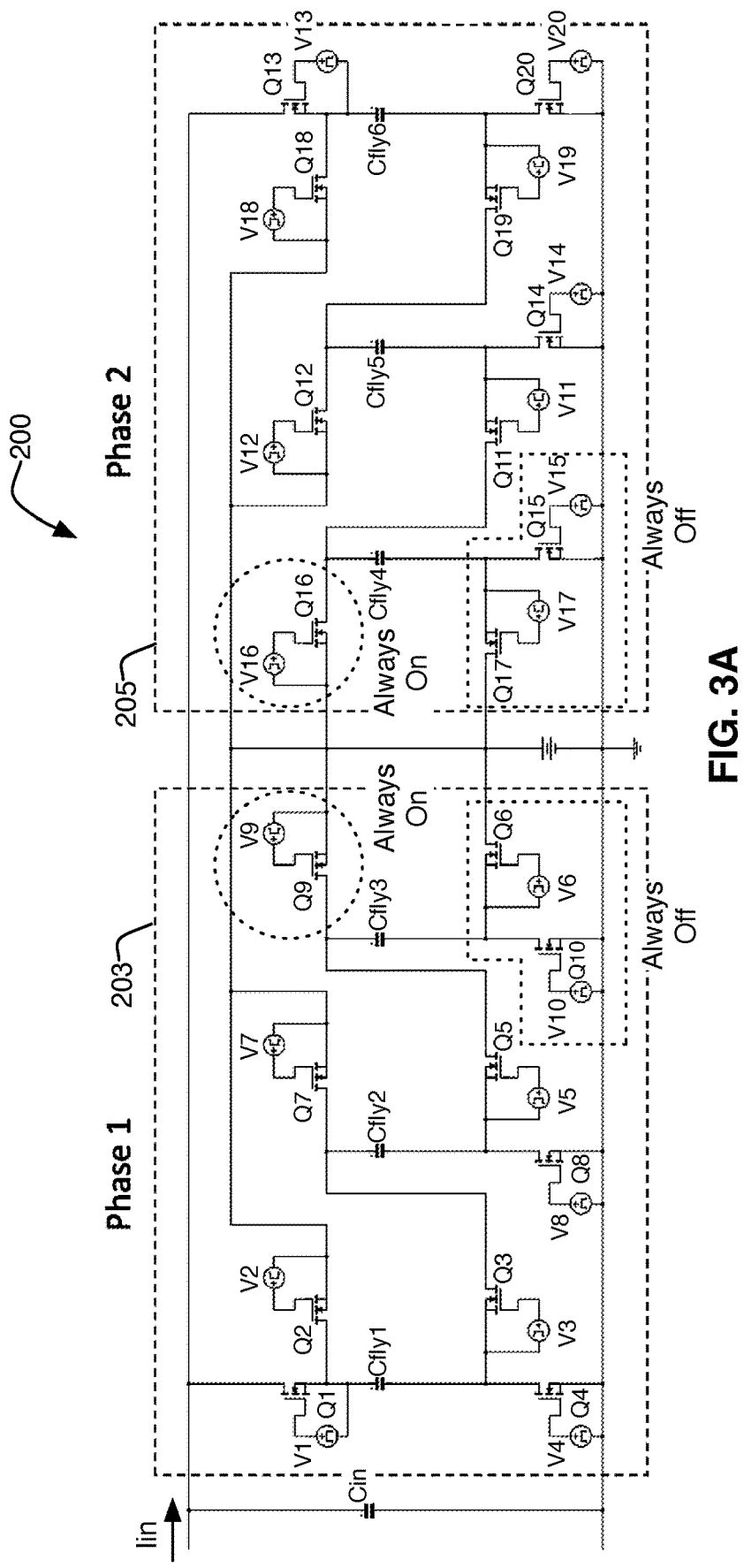
FIGS. 3A-3B illustrate the two-phase switched capacitor converter in a current tripler configuration.
Figure 3B:
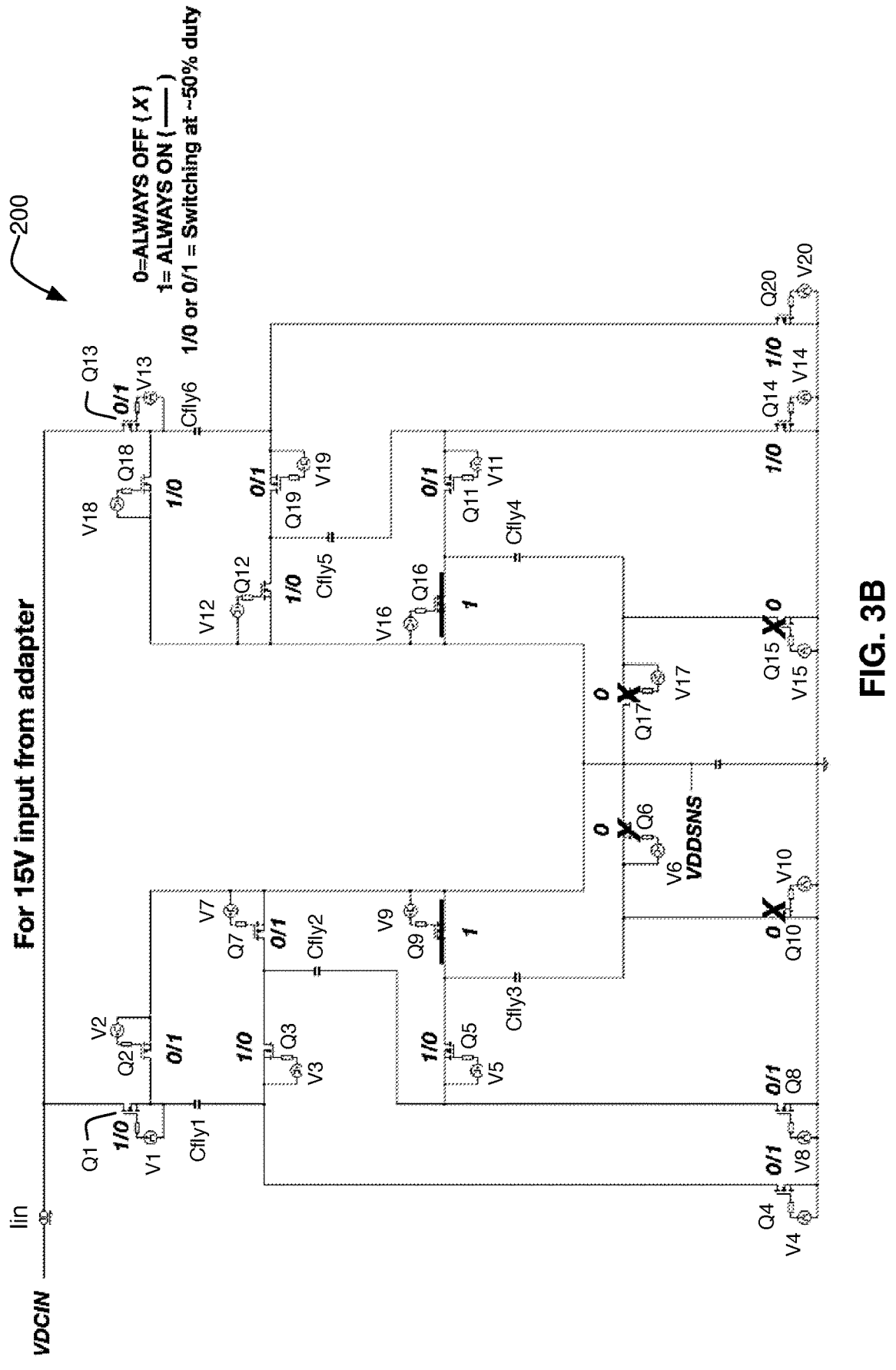

FIGS. 3A-3B illustrate the improved two-phase switched capacitor converter in a current tripler configuration. For example, when an adapter is USB-C/USB-PD PPS capable device rated only for 15V, converter 200 can be configured as current tripler by disabling one flying capacitor leg in each phase of the converter. (As noted above, the converter could be a single phase converter, but providing a two phase converter can improve ripple performance.) Disabling one flying capacitor leg can be achieved by changing the switching pattern of certain switching devices to always on or always off to prevent the corresponding flying capacitor from charging/discharging as described above. Otherwise, the remaining devices continue to operate as described above with respect to the current quadrupler mode of FIGS. 2A-2B. As shown in FIGS. 3A & 3B, one switching device in each phase (Q9 & Q16) can be always ON while two switching devices in each phase (Q6, Q10 & Q15, 17) can be always OFF. This effectively removes (i.e., selectively disables) one capacitor of each phase (Cfly3 & Cfly4) from the switched capacitor circuit, changing the step-down ratio from 4:1 to 3:1 because the conversion ratio of the illustrated switched capacitor converter topology is the number of flying capacitor legs/stages plus one.

In FIG. 3A, switching devices marked with the dotted circle (i.e., Q9 & Q16) are always ON while devices marked with the dotted rectangle (i.e., Q6, Q10, Q11, and Q17) are always OFF. In FIG. 3B, switching devices that are always on are marked with "1" and/or a bar through the switch, and switching devices that are always off are marked with a "0" or an "X" through the switch. All other devices continue to switch with a 50% duty cycle (understood to be an approximately 50% duty cycle to allow for a short dead time between transitions to prevent cross-conduction), with the respective phase relationships illustrated and described above. Control signals corresponding to this mode of operation can be generated by control circuitry 202.

Figure 4A:
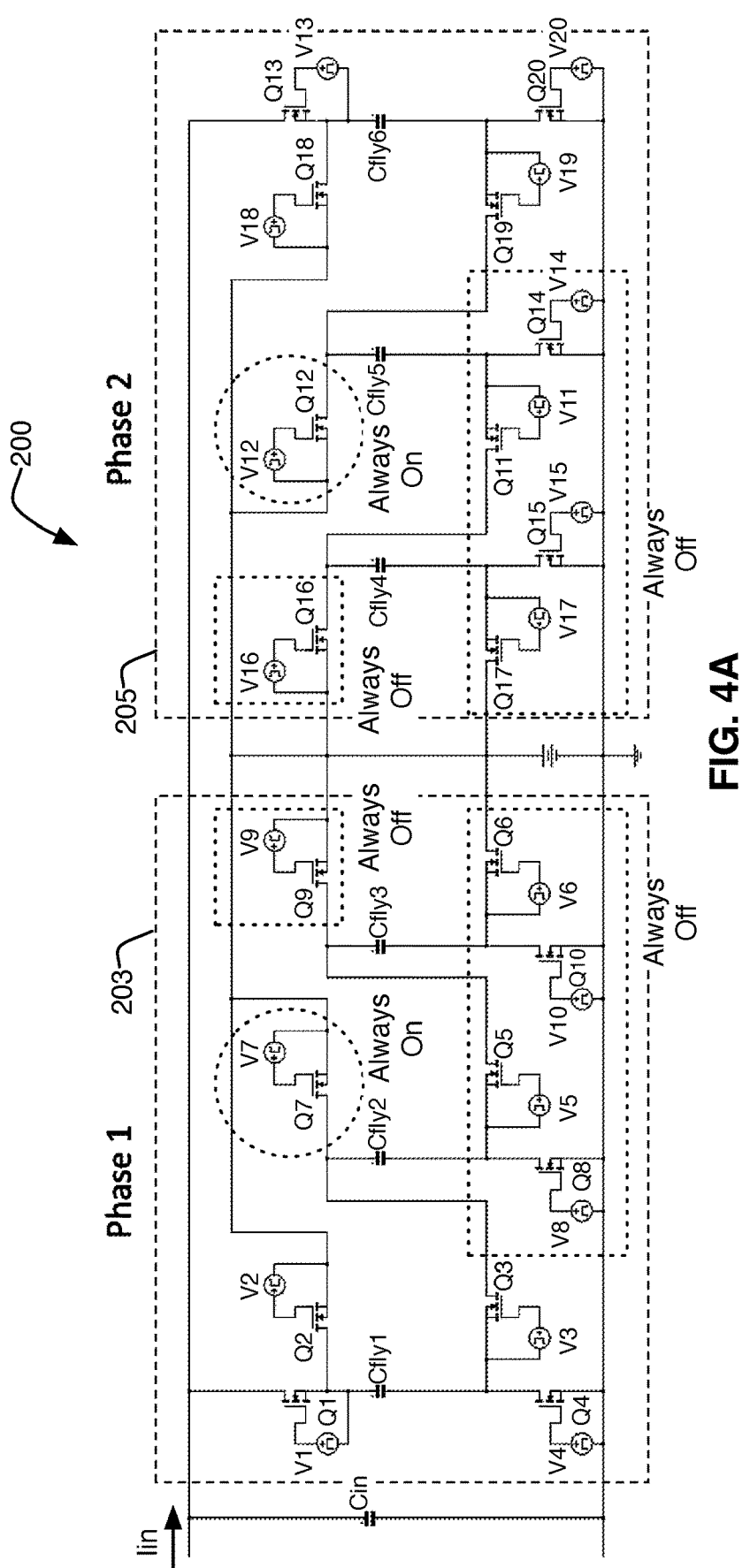
FIGS. 4A-4B illustrate the two-phase switched capacitor converter in a current doubler configuration.
Figure 4B:
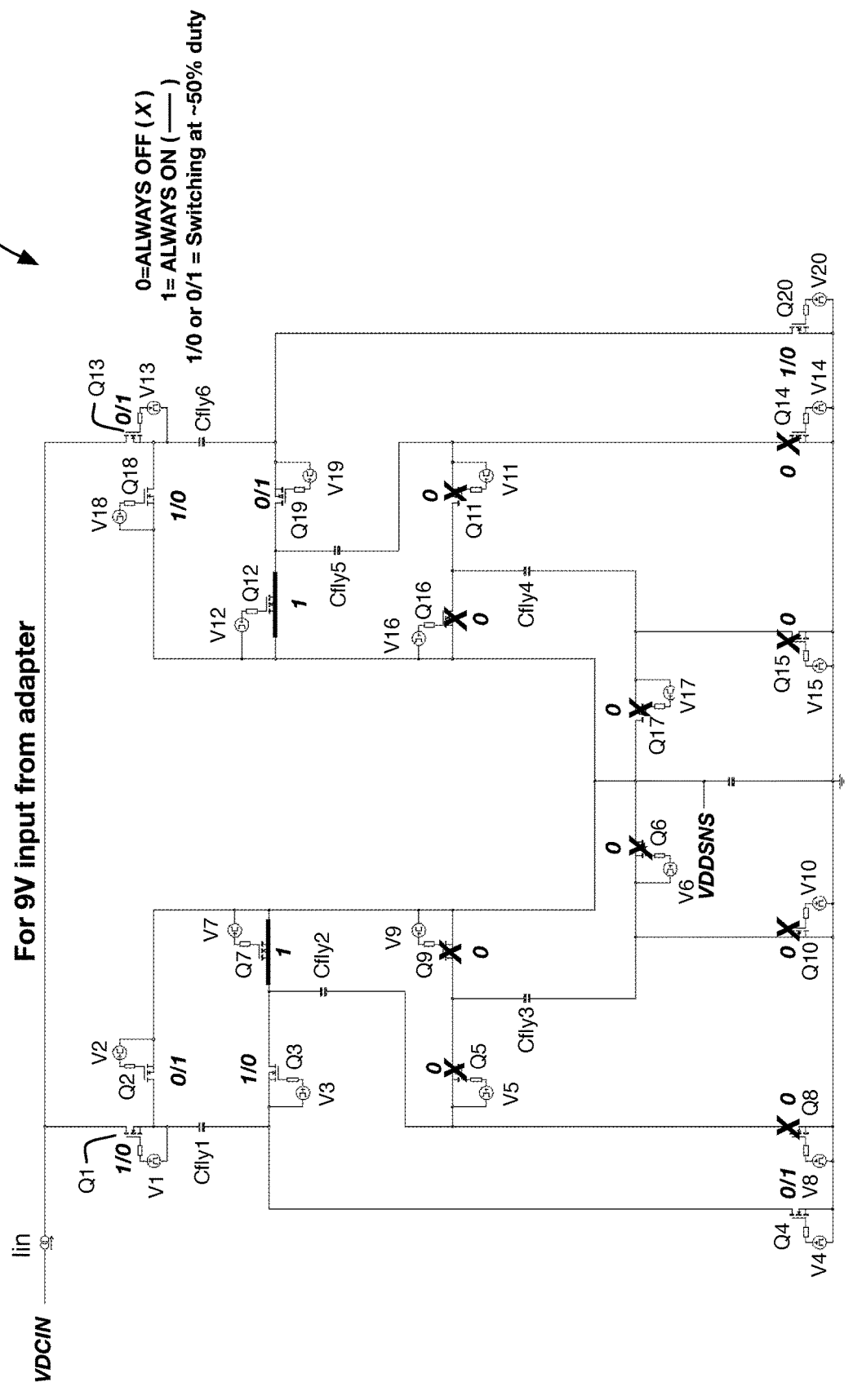

FIGS. 4A-4B illustrate the improved two-phase switched capacitor converter in a current doubler configuration. For example, if an AC/DC adapter connected to the device is USB-C/USB-PD PPS rated only for 9V, the converter of FIG. 2A-3B can be configured to operate as current doubler by selectively disabling two flying capacitor legs. As noted above, a switched capacitor converter with "N" flying capacitors will have a conversion ratio of (N+1):1. Thus, a current doubler requires only a single flying capacitor leg. Like the current tripler configuration of FIGS. 3A-3B, disabling two flying capacitor legs/stages to form a current doubler involves switching certain devices as always off, certain devices as always on, with all remaining devices continuing the alternating 50% duty cycle operation as described above. As shown in FIG. 4A-4B, one switching device in each phase (Q7 & Q12) is always ON while five devices in each phase (Q5, Q6, Q8, Q9, Q10 & Q11, Q14, Q15, Q16, Q17) are always OFF. All other devices continue to switch as described with respect to the current quadrupler mode (FIGS. 2A-2B) and/or current tripler mode (FIGS. 3A-3B). This effectively removes (i.e., selectively disables) two flying capacitors of each phase (i.e., CFLY2, CFLY3 & CFLY4, CFLY5) of the switched capacitor converter circuit, changing the step-down ratio to 2:1.

In FIG. 4A, devices marked with a dotted circle (i.e., Q7 and Q12) are always ON while devices marked with a dotted square (i.e., Q5, Q6, Q8, Q9, Q10 & Q11, Q14, Q15, Q16, Q17) are always OFF. In FIG. 4B, switching devices that are always on are marked with "1" and/or a bar through the switch, and switching devices that are always off are marked with a "0" and/or an "X" through the switch. All other devices continue to switch with a 50% duty cycle (understood to be an approximately 50% duty cycle to allow for a short dead time between transitions to prevent cross-conduction), with the respective phase relationships illustrated and described above. Control signals corresponding to this mode of operation can be generated by control circuitry 202.

Figure 5A:
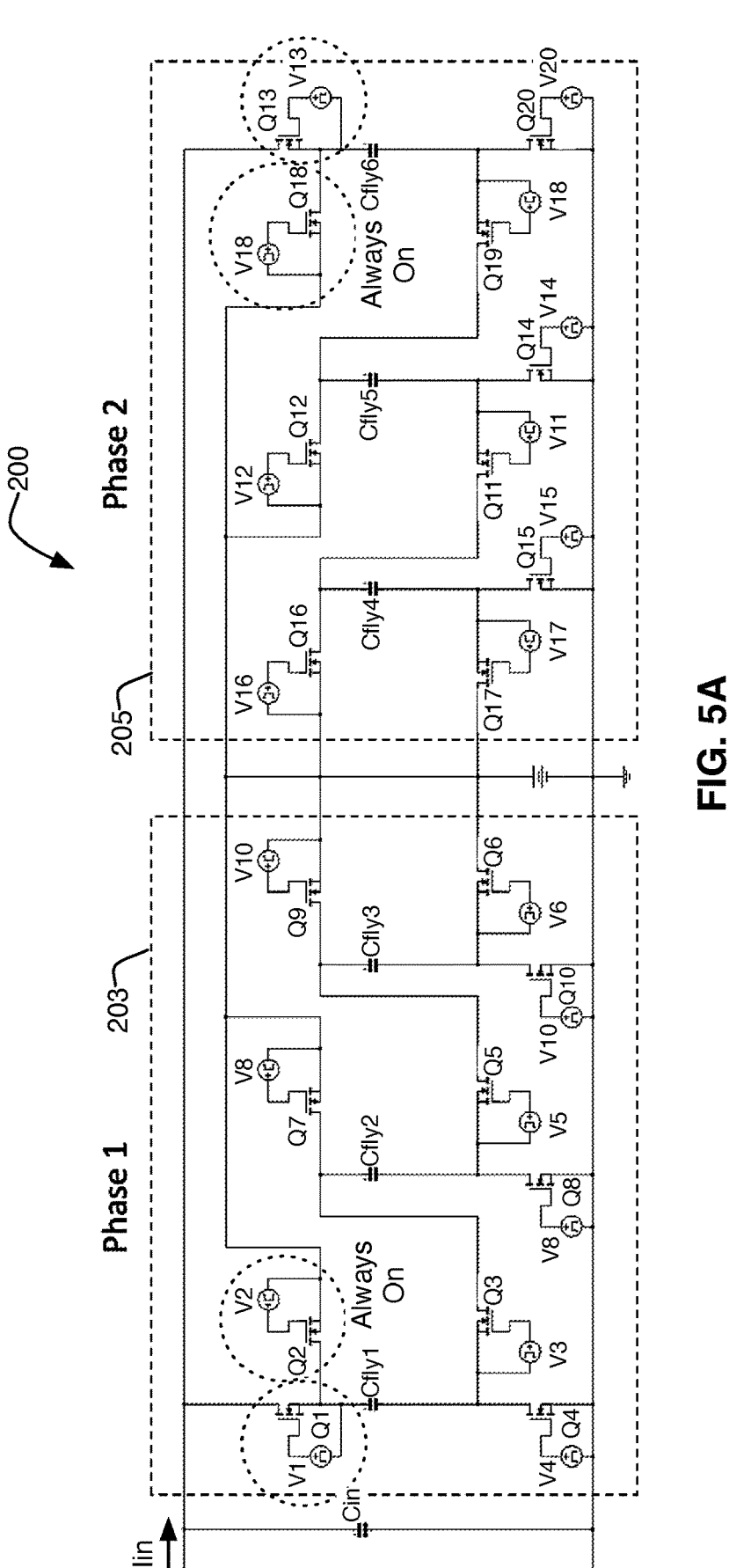
FIGS. 5A-5B illustrate the two-phase switched capacitor converter in a current pass-through configuration.
Figure 5B:
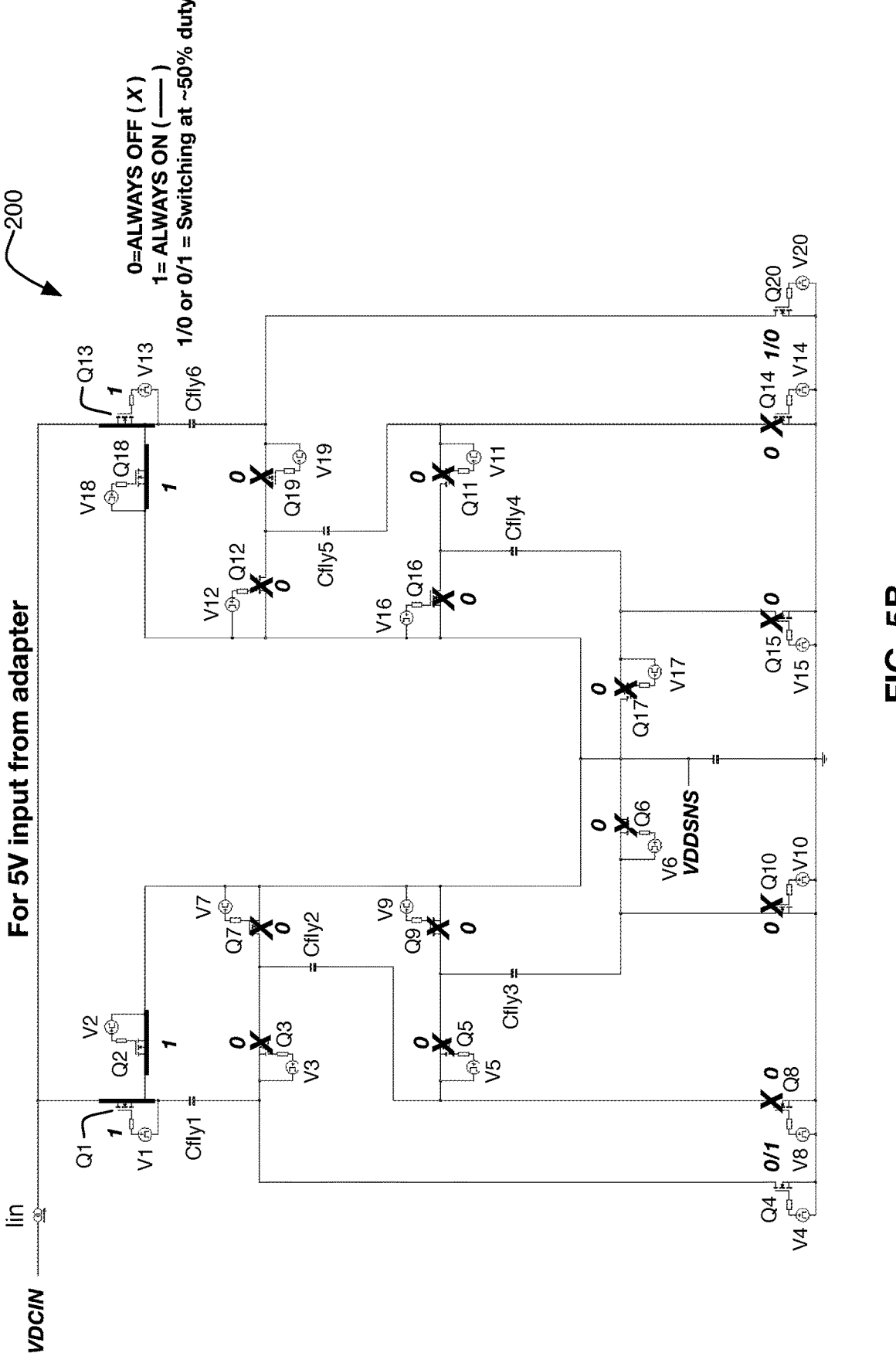

FIGS. 5A-5B illustrate the improved two-phase switched capacitor converter in a current pass-through configuration. For example, if an AC/DC adapter connected to the device is USB-C/USB-PD PPS capable but rated only for 5V, the converter can be operated in a bypass mode in which all of the flying capacitor stages are disabled. This can be achieved by keeping two devices in each phase always ON while all other devices are turned OFF. No switching devices are operating in the 50% duty cycle switching mode as described above. As shown in FIGS. 5A & 5B, two switching devices in each phase (Q1, Q2 & Q13, Q18) are always ON while all other devices are always OFF. As a result, all flying capacitors are effectively removed from the converter circuit (i.e., selectively disabled), and the converter connects the battery directly to the input of the converter for direct charging.

In FIG. 5A, devices marked with a dotted circle are always ON while all other devices are always OFF. In FIG. 5B, switching devices that are always on are marked with "1" and/or a bar through the switch, and switching devices that are always off are marked with a "0" and/or an "X" through the switch. Control signals corresponding to this mode of operation can be generated by control circuitry 202.

The foregoing describes exemplary embodiments of a switched capacitor converter that can employ different conversion ratios to effectively use a maximum voltage rating of a connected power source, such as a USB-C/USB-PD PPS adapter. Such configurations may be used in a variety of applications but may be particularly advantageous when used in conjunction with charging circuits for electronic devices. Although numerous specific features and various embodiments have been described, it is to be understood that, unless otherwise noted as being mutually exclusive, the various features and embodiments may be combined various permutations in a particular implementation. Thus, the various embodiments described above are provided by way of illustration only and should not be constructed to limit the scope of the disclosure. Various modifications and changes can be made to the principles and embodiments herein without departing from the scope of the disclosure and without departing from the scope of the claims.

The invention claimed is:

1. A switched capacitor converter battery charging circuit comprising:

an input configured to receive an input current;

an output configured to deliver an integer multiple of the input current to a battery;

a plurality of flying capacitor stages disposed between the input and output, wherein each of the plurality of flying capacitor stages comprises:

a flying capacitor;

a high side complementary switch pair; and a low side complementary switch pair;

and controller circuitry coupled to the plurality of flying capacitor stages that selectively enables or disables one or more of the plurality of flying capacitor stages to select the integer multiple responsive to a voltage supplied at the input.

2. The switched capacitor converter battery charging circuit of claim 1 wherein the plurality of flying capacitor stages includes a first plurality of flying capacitor stages forming a first phase of the switched capacitor converter battery charging circuit and a second plurality of flying capacitor stages forming a second phase of the switched capacitor converter battery charging circuit, wherein the first and second phases are operated in an interleaved manner to reduce current or voltage ripple.

3. The switched capacitor converter battery charging circuit of claim 1 wherein the controller circuitry operates the high side complementary switch pair and the low side complementary switch pair of a selectively enabled flying capacitor stage to alternate between connecting the flying capacitor in series with the battery and in parallel with the battery.

4. The switched capacitor converter battery charging circuit of claim 3 wherein the controller operates switching devices of the respective complementary switch pairs with a 50% duty cycle.

5. The switched capacitor converter battery charging circuit of claim 1 wherein the controller circuitry operates selected switching devices of a selectively disabled flying capacitor stage as always on or always off to prevent a corresponding flying capacitor from charging and discharging.

6. The switched capacitor converter battery charging circuit of claim 5 wherein the controller circuitry operates selected switching devices of a selectively disabled flying capacitor stage as always on or always off to prevent a corresponding flying capacitor from charging and discharging by operating the low side complementary switch pair as always off, operating one of the high side complementary switch pair as always on, and operating another of the high side complementary switch pair with a 50% duty cycle.

7. The switched capacitor converter battery charging circuit of claim 5 wherein the controller circuitry disables all flying capacitor stages by operating a high side complementary switch pair as both always on and operating all other switching devices as always off.

8. The switched capacitor converter battery charging circuit of claim 1 wherein the switched capacitor converter battery charging circuit comprises three flying capacitor stages, providing for selection of integer multiples of 4×, 3×, 2×, or 1×.

9. A switched capacitor converter battery charging circuit comprising:

an input configured to receive an input current;

an output configured to deliver an integer multiple of the input current to a battery;

a plurality of phases with each phase comprising a plurality of flying capacitor stages disposed between the input and output, wherein the plurality of phases are operated in an interleaved manner to reduce current or voltage ripple, wherein each of the plurality of flying capacitor stages comprises;

a flying capacitor;

a high side complementary switch pair; and a low side complementary switch pair;

and controller circuitry coupled to the plurality of flying capacitor stages that selectively enables or disables one or more of the plurality of flying capacitor stages to select the integer multiple responsive to a voltage supplied at the input.

10. The switched capacitor converter of claim 9 wherein the controller circuitry operates the high side complementary switch pair and the low side complementary switch pair of a selectively enabled flying capacitor stage to alternate between connecting the flying capacitor in series with the battery and in parallel with the battery.

11. The switched capacitor converter of claim 10 wherein the controller operates switching devices of the respective complementary switch pairs with a 50% duty cycle.

12. The switched capacitor converter of claim 9 wherein the controller circuitry operates selected switching devices of a selectively disabled flying capacitor stage as always on or always off to prevent a corresponding flying capacitor from charging and discharging.

13. The switched capacitor converter of claim 12 wherein the controller circuitry operates selected switching devices of a selectively disabled flying capacitor stage as always on or always off to prevent a corresponding flying capacitor from charging and discharging by operating the low side complementary switch pair as always off, operating one of the high side complementary switch pair as always on, and operating another of the high side complementary switch pair with a 50% duty cycle.

14. The switched capacitor converter of claim 12 wherein the controller circuitry disables all flying capacitor stages by operating a high side complementary switch pair as both always on and operating all other switching devices as always off.

15. The switched capacitor converter of claim 9 wherein the switched capacitor converter comprises three flying capacitor stages, providing for selection of integer multiples of 4×, 3×, 2×, or 1×.

16. A method of operating a switched capacitor converter battery charger, the method comprising:

selectively enabling or disabling one or more flying capacitor stages of the switched capacitor converter to select an integer multiple applied to an input current of the battery charger to produce an output current supplied to the battery, wherein each of the one or more flying capacitor stages comprises:

a flying capacitor;

a high side complementary switch pair; and a low side complementary switch pair;

wherein the integer multiple is selected in response to an input voltage of the switched capacitor converter battery charger.

17. The method of claim 16 wherein selectively enabling one or more flying capacitor stages comprises operating a plurality of switching devices with a 50% duty cycle to alternate between connecting flying capacitors of the one or more flying capacitor stages in series with the battery and in parallel with the battery.

18. The method of claim 16 wherein selectively disabling one or more flying capacitor stages comprises operating one or more switching devices as always on and one or more switching devices always off to prevent flying capacitors of the one or more flying capacitor stages from charging and discharging.

*    *    *    *    *